No. 665,751. Patented Jan. 8, 1901.
W. L. ORAN.
HARROW.
(Application filed Dec. 6, 1899.)
(No Model.)
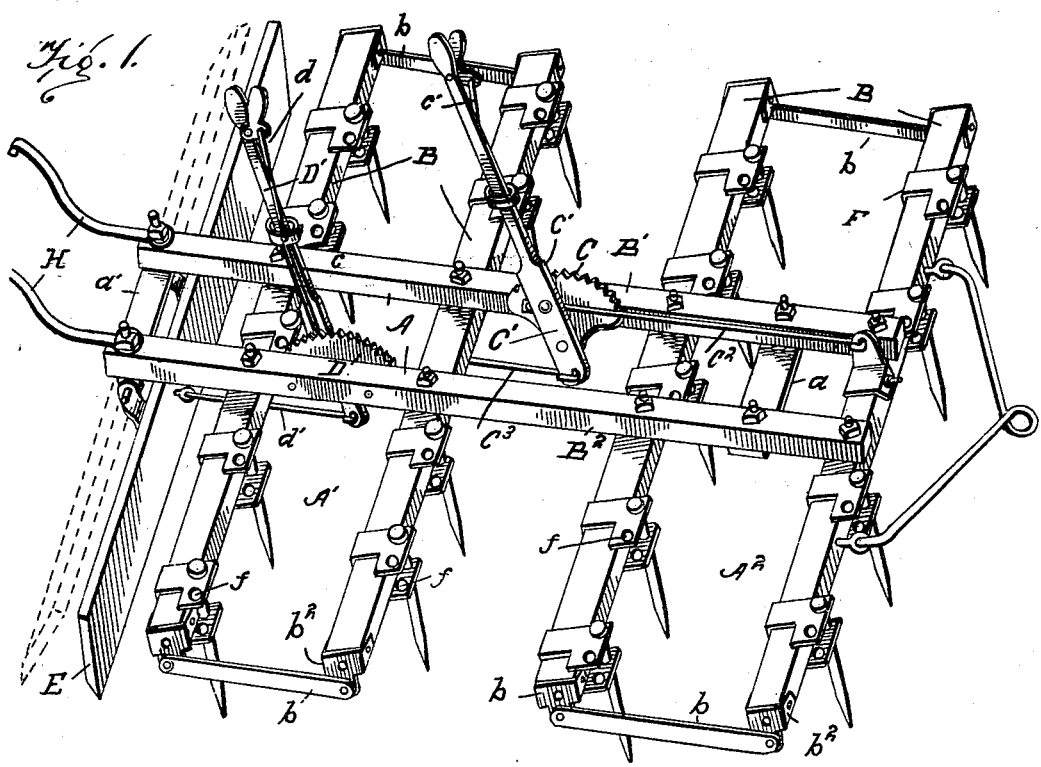
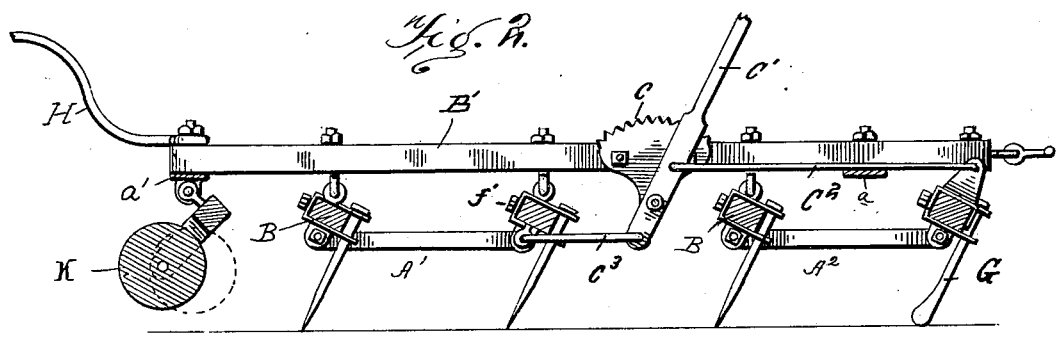
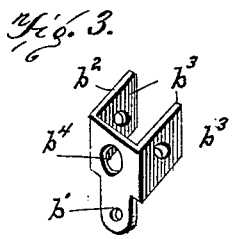
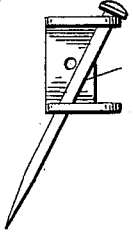
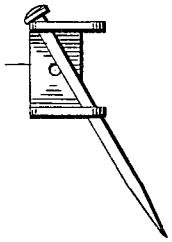
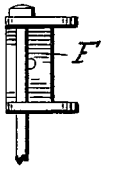
Witnesses
Charles K. Davies.
Wm. B. Kirkam
Inventor
William L. Oran
by P. T. Cameron
his Attorney
THE NORRIS PETERS CO., PHOTO-LITHO., WASHINGTON, D. C.

UNITED STATES PATENT OFFICE.

WILLIAM L. ORAN, OF KINGSTON, TENNESSEE.

HARROW.

SPECIFICATION forming part of Letters Patent No. 665,751, dated January 8, 1901.

Application filed December 6, 1899. Serial No. 739,418. (No model.)

*To all whom it may concern:*

Be it known that I, WILLIAM L. ORAN, a resident of Kingston, Roane county, Tennessee, have invented a new and useful Improvement in Harrows, which invention is fully set forth in the following specification.

My invention relates to harrows, and has for one object to provide a harrow which shall thoroughly pulverize the soil and at the same time provide a smooth and even surface seedbed.

A further object is to construct a harrow which may have the teeth thereon readily adjustable into any desired position, whereby they may accommodate themselves to rows of plants to be tilled or cultivated, and, generally, to provide a harrow which shall be cheaply manufactured, efficient in all its operations, and not likely to get out of order.

With these objects in view my invention consists in the combination of parts and construction of details hereinafter particularly described and then pointed out in the claims.

I have illustrated one form which my invention may assume in the accompanying drawings, in which—

Figure 1 is an isometric perspective view of my harrow. Fig. 2 is a vertical central section taken from front to rear through the harrow. Fig. 3 is a perspective view of the end clip hereinafter described; and Figs. 4, 5, and 6 are front elevations of tooth-holding clips, showing the teeth adjusted therein in different positions.

The general framework of my harrow consists of two fore-and-aft sections $A'$ $A^2$, each composed of two parallel tooth-bars B, flexibly united at their ends by links $b$, which links are pivotally connected at each end thereof to depending lugs $b'$ on the end clips $b^2$, secured to the ends of each one of the tooth-beams B, as clearly shown in Fig. 1 of the drawings. These end clips $b^2$ are secured to the end beams by suitable rivets or bolts passing through holes on the side plates $b^3$ thereof and, if desired, also by a suitable pin passing through a hole $b^4$ into the end of the bar B. Each of the sections $A'$ $A^2$ is flexibly connected to a third section A, extending longitudinally from the front of the harrow across the top of the sections $A'$ $A^2$ and projecting some distance to the rear of the harrow. The frame or section A is composed of two bars $B'$ $B^2$, rigidly connected together by suitable cross-bars $a$ $a'$, and the sections $A^2$ $A'$ are connected to said section A by means of suitable eyebolts passing through the tooth-bars B and the frame-bars $B'$ $B^2$, as will be readily understood by an inspection of Fig. 2. Firmly secured to a side face of one of the bars—as, for example, $B'$—is a toothed segment C, to a lower depending lug or portion of which is pivoted a lever $C'$, which lever is connected by a link $C^2$ with the section $A^2$ of the harrow and by a link $C^3$ with the section $A'$ of the harrow, the links $C^2$ $C^3$ being for convenience of construction pivotally secured to the lever $C'$, one above and the other below its pivotal point, and being also pivotally connected, one of them above the section $A^2$ and the other at a point below the section $A'$.

Mounted upon the lever $C'$ is a ratchet-bar $c'$, which engages the toothed segment C in a way well understood to retain the lever in any position to which it may be adjusted. When the lever $C'$ is adjusted to the rear portion of the segment, as is shown in Fig. 1, the frames $A'$ $A^2$ will be tilted, so as to incline the teeth of the harrow in the forward direction, as shown in Fig. 1. On the other hand, when the lever $C'$ is adjusted to the forward extremity of the segment C the frames $A'$ $A^2$ will be tilted, so as to incline the teeth of the harrow to the rear, as shown in Fig. 2. There is also attached to one of the frame-bars of the frame A and preferably to the bar $B^2$ a toothed segment D, having a lever $D'$ pivoted thereto and bearing a ratchet-bar $d$, in every respect similar to the segment C and lever $C'$. The lower end of said lever $D'$, however, is connected by a link $d'$ to a tail-board or scraper E, pivotally supported on the projecting ends of the beams $B'$ $B^2$ and extending entirely across the rear portion of the harrow. The said scraper or tail-board E may be adjusted into a vertical position, as shown in Fig. 1, or may be inclined to the rearward position, as shown in dotted lines in Fig. 1, by the operation of the lever $D'$, as will be well understood. For the purpose of enabling the operation of the harrow to be controlled a handle H is rigidly secured to the projecting ends of the beams $B'$ $B^2$.

F represents clips embracing the tooth-beams B and extending above and beneath the same and some distance forward thereof both above and below the beams, the projecting portions being each provided with a plurality of tooth-receiving holes or perforations $f$ and the clip being provided on its rear side with a screw-threaded opening through which set-screw $f'$ works, with its inner end bearing against the rear face of the tooth-bar. Each of the tooth-clips is provided with a plurality of tooth-receiving openings both above and below the tooth-bar. Preferably the openings are in alinement, so that a tooth, if desired, may be passed through one opening above and one opening below and the set-screw adjusted, so as to draw the tooth back firmly against the front face of the tooth-bar, thereby firmly securing the clip and tooth in position. The teeth may, if desired, be passed through the holes which are in vertical alinement in the upper and the lower sections of the clip, as shown in Fig. 6, or they may be inclined either to the right or to the left by passing the tooth through holes which are out of vertical alinement, as shown in Figs. 4 and 5. Furthermore, it will be understood that the clips may be adjusted longitudinally to any desired position upon the tooth-bars B. Where the harrow is to be used merely for the purpose of pulverizing the soil, it will be most advantageous to arrange the teeth in stagger position on the various bars; but where rows of plants—as, for instance, young corn—are to be cultivated the teeth may be arranged so that they will be in rows extending from the front to the rear of the harrow. Furthermore, these rows may have their several teeth all slanted in the same direction or every other row may have the teeth slanted in reverse direction or every other tooth in each row may have the teeth slanted in reverse direction. Again, the teeth may be arranged with one tooth slanted to the right, the next one behind it arranged vertically, and the third tooth inclined to the left.

I may, if desired, supply my harrow with any suitable number of sod-cutting teeth, such as shown at G in Fig. 2, and I may substitute for the scraper E (shown in Fig. 1) a roller K, (shown in Fig. 2,) said roller being mounted in a frame hung to the projecting ends of the cross-beams B' B² in the manner similar to the mounting of the scraper E, said roller turning on a horizontal axis in said frame.

The operation of my harrow is as follows: If it is desired to pulverize the soil to put the same in condition for seeding, the teeth are arranged in stagger, as shown in Fig. 1, and the scraper E adjusted either vertically, as shown in full lines, or inclined, as shown in dotted lines in said figure. If the desired operation of the tail-board is merely to assist in crushing and pulverizing the clods, it is preferably inclined rearward; but where it is desired to utilize the same as a scraper to fill up small gulleys, parting-furrows, and the like it is adjusted in a vertical position. If desired, a platform-board may be placed between the beams B' B² and resting upon the cross-plates $a$ $a'$, upon which the driver may sit or stand. If, on the other hand, it is desired to employ the harrow as a cultivator, the teeth are adjusted in suitable rows extending from front to rear of the harrow and properly spaced and the scraper or roller, as the case may be, removed. The flexible connections of the two sections of the harrow to the framework extending from the front to the rear provide an exceedingly light but very strong frame for the harrow, while at the same time permitting that freedom of movement of the parts which will prevent unnecessary strain thereon. By reason of my double adjustable and reversible tooth-clamp F, I am enabled to adjust the teeth in any desired position and with any desired slant or inclination, so as to perform their work in the most efficient manner.

Having thus described my invention, what I claim is—

1. A harrow consisting of a top frame extending from the front to the rear thereof, a plurality of fore-and-aft tooth-supporting sections flexibly connected to said frame and means for relatively and simultaneously adjusting said sections with relation to the frame.

2. In a harrow, the combination of a rigid top section extending from the front to the rear thereof, and tooth-supporting sections flexibly connected to said top section, each of said tooth-supporting sections consisting of a plurality of toothed bars flexibly connected together, and means carried by the top section for simultaneously adjusting the inclination of the tooth-supporting sections.

3. In a harrow, the combination of a top frame, tooth-supporting beams flexibly connected to said frame and to each other, means for adjustably securing the harrow-teeth to said beams, means for longitudinally adjusting the teeth along the beam, and means for adjusting the angle of inclination of the teeth.

4. In a combined harrow and cultivator, the combination of a top frame, tooth-beams flexibly supported to said frame and pivotally connected to each other, with teeth longitudinally adjustable upon said beams whereby said teeth may be arranged in stagger or in rows extending from the front to the rear thereof as desired.

In testimony whereof I have signed this specification in the presence of two subscribing witnesses.

WILLIAM L. ORAN.

Witnesses:
S. M. FRENCH,
C. F. SMITH.